US008508207B2

United States Patent
Burns et al.

(10) Patent No.: US 8,508,207 B2
(45) Date of Patent: Aug. 13, 2013

(54) CONTROLLING A SKEW TIME OF SWITCHES OF A SWITCHING REGULATOR

(75) Inventors: Lawrence M. Burns, Los Altos, CA (US); James E. C. Brown, San Jose, CA (US)

(73) Assignee: R2 Semiconductor, Sunnyvale, CA (US)

( * ) Notice: Subject to any disclaimer, the term of this patent is extended or adjusted under 35 U.S.C. 154(b) by 221 days.

(21) Appl. No.: 13/090,212

(22) Filed: Apr. 19, 2011

(65) Prior Publication Data
US 2012/0105045 A1     May 3, 2012

Related U.S. Application Data

(63) Continuation-in-part of application No. 12/915,203, filed on Oct. 29, 2010, now Pat. No. 8,395,362.

(51) Int. Cl.
*G05F 1/00*     (2006.01)

(52) U.S. Cl.
USPC .......................................................... 323/283

(58) Field of Classification Search
USPC .................. 323/234, 265, 282–283, 304, 311
See application file for complete search history.

(56) References Cited

U.S. PATENT DOCUMENTS

| | | | |
|---|---|---|---|
| 6,614,208 B2 * | 9/2003 | Narita | 323/283 |
| 7,098,640 B2 | 8/2006 | Brown | |
| 7,391,194 B2 | 6/2008 | Brown | |
| 7,456,620 B2 | 11/2008 | Maksimovic | |
| 7,518,350 B2 | 4/2009 | Leung | |
| 7,589,506 B2 | 9/2009 | Brown | |
| 7,683,594 B2 | 3/2010 | Kim et al. | |
| 7,859,237 B2 | 12/2010 | Coleman | |
| 7,868,597 B2 | 1/2011 | Dequina | |
| 2006/0022656 A1 * | 2/2006 | Leung et al. | 323/283 |
| 2008/0224677 A1 | 9/2008 | Kim et al. | |
| 2008/0278984 A1 | 11/2008 | Stanley | |
| 2009/0027021 A1 | 1/2009 | Dequina | |
| 2009/0237059 A1 | 9/2009 | Chiba | |
| 2010/0020569 A1 | 1/2010 | Melanson | |

OTHER PUBLICATIONS

Notification of Transmittal of the International Search Report and the Written Opinion of the International Searching Authority, or the Declaration, International Application No. PCT/US 12/32230, International Filing Date Apr. 4, 2012, Search dated Jul. 2, 2012.
"Energy-efficiency on-chip power management: System, circuit and device perspectives", Eduard Alarcon, 2009 IEEE Circuits and Systems Society Distinguished Lecturer Program, Oct. 19, 2009.

(Continued)

*Primary Examiner* — Timothy J Dole
*Assistant Examiner* — Afework Demisse
(74) *Attorney, Agent, or Firm* — Brian R. Short

(57) ABSTRACT

Embodiments for methods and apparatuses for controlling a skew time of switches of a switching voltage regulator are disclosed. One method includes generating a switching voltage through closing and opening of a series switch and a shunt switch as controlled by a series switch control signal and a shunt switch control signal. An error signal is generated that is proportional to a relative displacement of an on-interval of the series switch and an off-interval of the shunt switch. A relative delay of the series switch control signal and the shunt switch control signal is adjusted based on the error signal, and a regulated output voltage is generated based upon the switching voltage.

22 Claims, 16 Drawing Sheets

(56) References Cited

OTHER PUBLICATIONS

"Continuous Time Optimization of Gate Timing for Synchronous Rectification", J. Kimball and P. Krein, 1996 Midwest Symposium on Circuits and Systems p. 1015.

"Autonomous control technique for high-performance switches", P. Krein and R. Bass, IEEE Trans. Industrial Electronics, v. 39, p. 215 (1992).

"Predictive Gate Drive Boosts Synchronous DC/DC Power Converter Efficiency", Application Report SLUA281, Steve Mappus, Texas Instruments, Inc., Apr. 2003.

"Digital Multimode Buck Converter Control With Loss-Minimizing Synchronous Rectifier Adaptation", A. Peterchev and S. Sanders, IEEE Trans Power Elect v 21 p. 1588 (2006).

"Sensorless Optimization of Dead Times in DC-DC Converters with Synchronous Rectifiers", V. Yousefzadeh and D. Maksimovic, IEEE Trans Power Elect v 21 p. 994 (2006).

\* cited by examiner

CONTROLLING A SKEW TIME OF SWITCHES OF A SWITCHING REGULATOR

RELATED APPLICATIONS

This patent application is a continuation-in-part of pending U.S. patent application Ser. No. 12/915,203, filed Oct. 29, 2010.

FIELD OF THE DESCRIBED EMBODIMENTS

The described embodiments relate generally to power conversion. More particularly, the described embodiments relate to methods and apparatuses for controlling a skew time of switches of a switching voltage regulator.

BACKGROUND

Switched-mode DC-DC converters are commonly used to provide the voltage required for operating electronic circuits from a differing supply voltage with minimal losses. An example of a DC-DC converter 101 (in this case a buck converter, configured to reduce the supply voltage) is depicted in FIG. 1. Although a buck converter is shown in FIG. 1, it is to be understood that the discussion below applies to any converter configuration.

In the configuration shown in FIG. 1, the series switch (hereinafter SW1) and the shunt switch (hereinafter SW2) are alternately closed in order to provide a varying output voltage to the load. Simplified control waveforms for the switches are depicted in FIG. 2. When the series switch SW1 is on, current flows from the input voltage through SW1 to the output inductor $L_{out}$. When the series switch SW1 is off, and the shunt switch SW2 is on, the inductor draws current from the ground node through SW2, which acts as a synchronous rectifier. (It is also possible to have the current decrease to 0 or become negative during this portion of the operating cycle.) The duty cycle D is defined as the proportion of time during which SW1 is on:

$$D = \frac{T_{on}}{T_{on} + T_{off}}$$

In normal steady-state continuous-mode operation, when parasitic losses can be neglected, the output voltage is proportional to the duty cycle:

$$V_{out} = DV_{in}$$

If both switches are on simultaneously, current can flow through them directly from the input voltage supply to ground. This "shoot-through" current can be very large, since its only impediment is the on-resistance of the switches. Shoot-through current does not flow through the load and so is wasted, degrading the efficiency of the converter. Therefore, shoot-through is to be avoided. In order to accomplish this end, "dead times" are normally provided at the end of each switch on-time, during which both switches are off.

During the dead times (shown in FIG. 2 as DT1 and DT2), current continues to flow due to the influence of the typically large-value output inductor $L_{out}$. Since both switches are open, this current will charge or discharge the parasitic capacitance of the switch node, which is typically small. As a consequence it is often the case that the potential at the switch node $V_{SW}$, hereinafter referred to as the switching voltage, changes rapidly during the dead times.

It is desirable to have methods and apparatuses for adjusting dead times of a voltage converter to accommodate for drive circuit asymmetries and dead time disparities.

SUMMARY

An embodiment includes a method for controlling a skew time of switches of a switching voltage regulator. The method includes generating a switching voltage through closing and opening of a series switch and a shunt switch as controlled by a series switch control signal and a shunt switch control signal. An error signal is generated that is proportional to a relative displacement of an on-interval of the series switch and an off-interval of the shunt switch. A relative delay of the series switch control signal and the shunt switch control signal is adjusted based on the error signal, and a regulated output voltage is generated based upon the switching voltage.

Another embodiment includes a switching voltage regulator. The switching voltage regulator includes a series switch element, a shunt switch element, and a switching controller operative to generating a switching voltage through closing and opening of a series switch and a shunt switch as controlled by a series switch control signal and a shunt switch control signal. A skew detector is operative to generate an error signal proportional to a relative displacement of an on-interval of the series switch and an off-interval of the shunt switch. The switch controller is further operative to adjust a relative delay of the series switch control signal and the shunt switch control signal based on the error signal. The voltage regulator is operative to generate a regulated output voltage based upon the switching voltage.

Other aspects and advantages of the described embodiments will become apparent from the following detailed description, taken in conjunction with the accompanying drawings, illustrating by way of example the principles of the described embodiments.

DETAILED DESCRIPTION

The described embodiments provide examples of apparatuses and methods for controlling dead times of switching voltage regulators. More specifically, the described embodiments include the generation of an error signal proportional to a relative displacement of an on-interval of a series switch and an off-interval of a shunt switch of a switching voltage regulator. Further, a relative delay of the series switch control signal and the shunt switch control signal is adjusted based on the error signal.

In some applications, the dead times DT1 and DT2 are separately optimized. However, the best performance of the dead time setting algorithms is obtained when the starting dead times can be reliably set to be equal and small, but without undesirable shoot-through currents occurring. Therefore, it is important to establish the relative timing of the control signals for the switches SW1 and SW2 to provide equal positive dead times DT1 and DT2.

Figure 1:
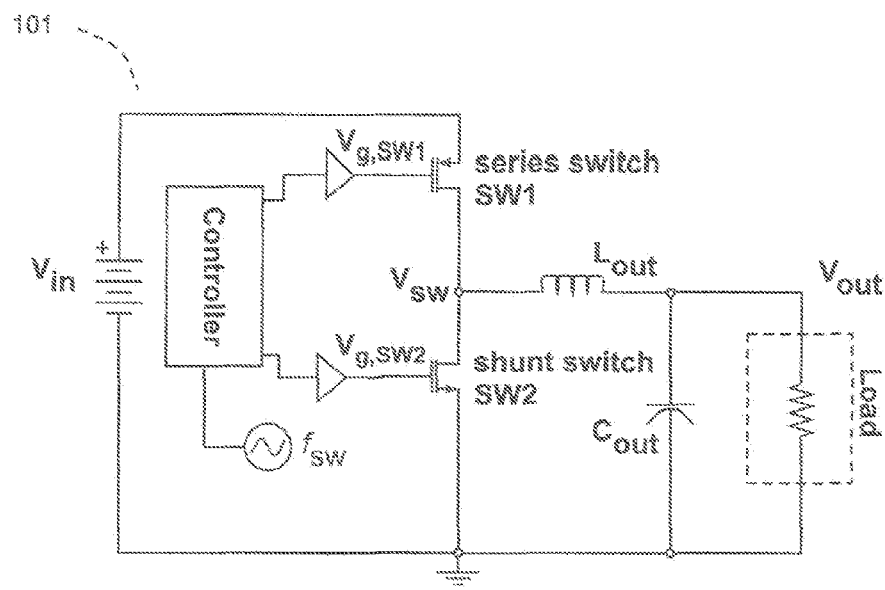
FIG. 1 shows an example of a prior art embodiment of a switched-mode DC-DC converter.
Figure 2:
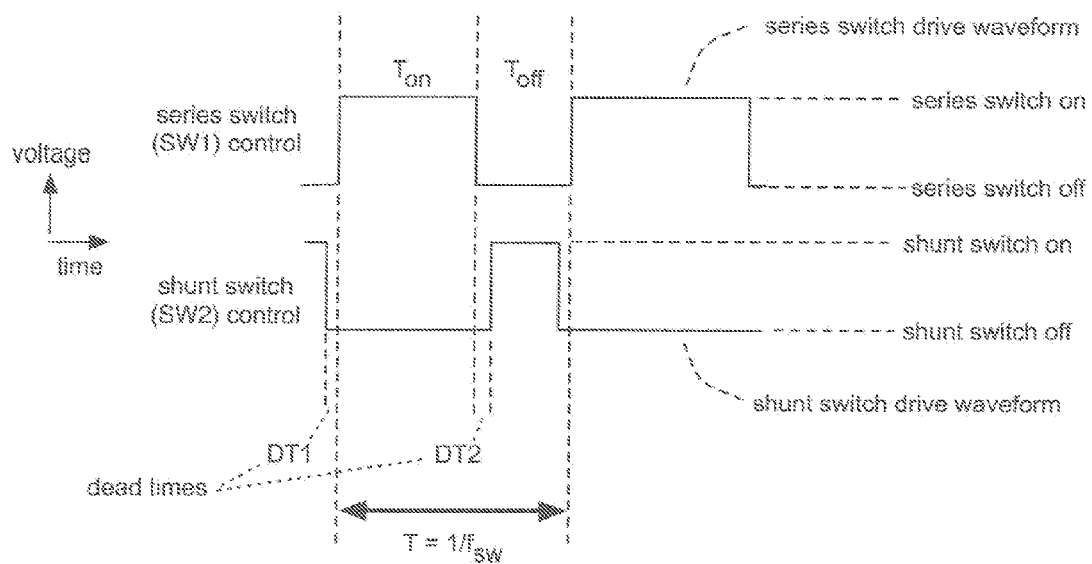
FIG. 2 shows an example of a drive circuit and control signal waveforms that depict a differential delay between control signals due to asymmetries in the drive circuit.
Figure 3:
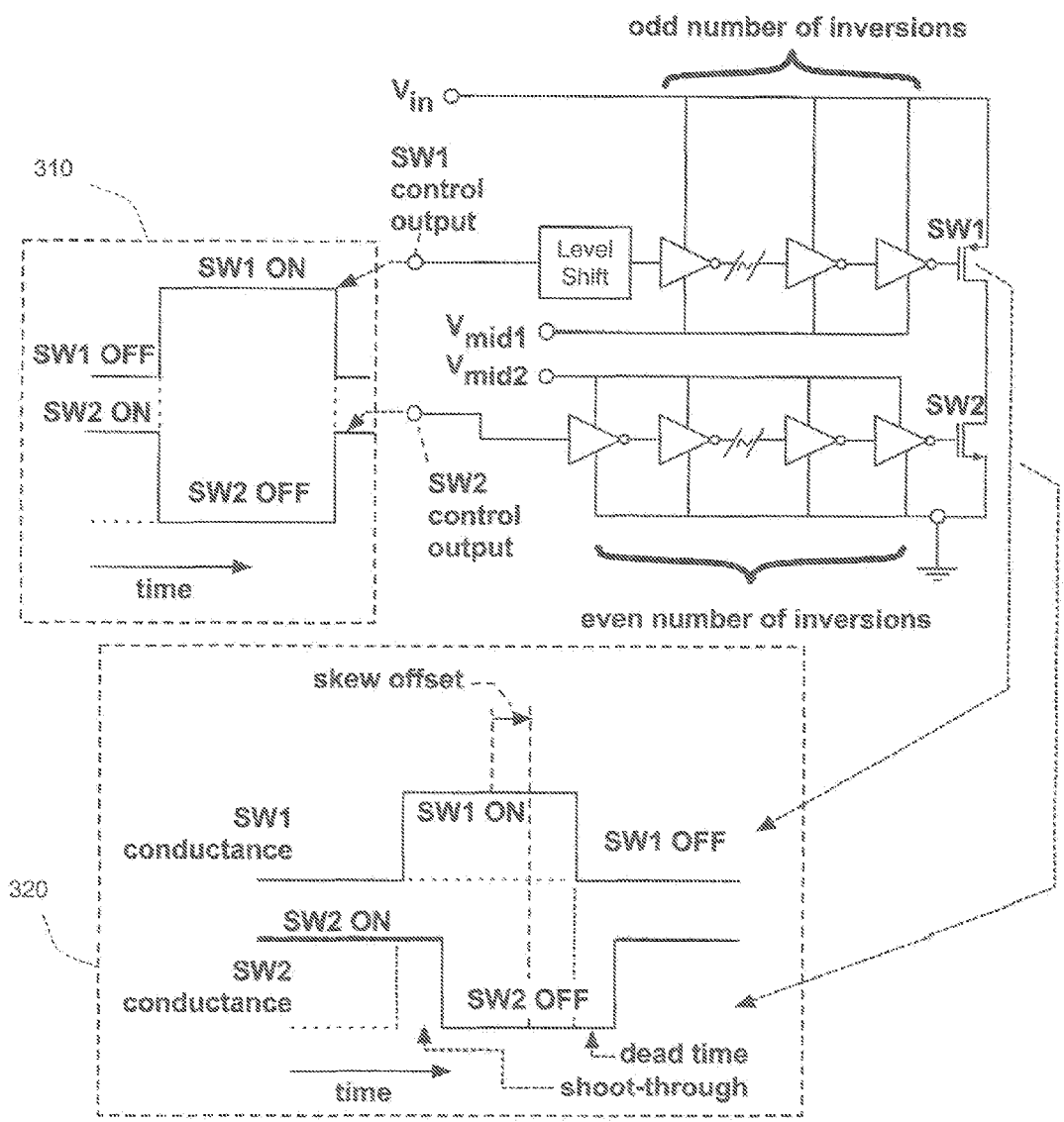
FIG. 3 shows an example of a circuit for producing control signals for switches of a voltage regulator.

FIG. 3 shows an example of an embodiment of a circuit for producing control signals of a voltage regulator. Here, the controller produces two signals, one to control the series switch SW1 and a second signal to control the shunt switch SW2. These signals are typically logical signals, whose low level is essentially local ground, and whose high level is a voltage suitable for logic circuitry, such as 1.8 V. The logic signal is produced by a small inverter or buffer not capable of driving the large input capacitance of switches SW1 or SW2 directly. Therefore a chain of buffer amplifiers of successively increasing size are used to deliver the signals to the switching transistors. In the case where these control signals are to be employed to switch an input voltage whose value exceeds the allowable voltages for the transistors used in switching, it may also be necessary to shift the signal level. For example, FIG. 3 depicts two buffer chains, one that operates between the voltages $V_{in}$ and $V_{mid1}$, and a second that operates between the voltages $V_{mid2}$ and ground. The intermediate voltages $V_{mid1}$ and $V_{mid2}$ are chosen to ensure that excessive voltage stress is not applied to the gates of SW1 or SW2. (Cascode configurations, not shown here for simplicity, may also be used for the switches SW1 and SW2.) Alternatively, transistors that can withstand more VDS than VGS (such as laterally-diffused MOS devices) can also be used. If the series switch SW1 is implemented as a PMOS device, it is also necessary to invert the signal either in the controller logic, or in the chain of driver amplifiers. Finally, a sizable number of inverter stages may be employed for both SW1 and SW2, resulting in a large absolute delay between the controller signal and the signal at the gate of the switching transistors. As a result of these long and possibly mismatched delays, it is likely that two signals whose edges are well-aligned at the Controller (first inset) may not lead to time-aligned switching action in SW1 and SW2 (second inset). In addition, the delay offsets may differ for rising and falling edges.

It is useful to include a sensor arrangement, herein referred to as the skew detector, to provide a measure of the difference between the two dead times DT1 and DT2. For embodiments of the skew detector, the goal is not to force the rising and falling edges of SW1 and SW2 to be coincident, but to establish the condition where the ON time of SW1 is accurately centered within the OFF time of SW2—that is, where the dead times DT1 and DT2 are equal, irrespective of their actual values. For an embodiment, this includes the skew detector generating an error signal proportional to a relative displacement of an on-interval of the series switch and an off-interval of the shunt switch. The error signal is used to adjust a relative delay between the control signals SW1 and SW2. This is in contradistinction to conventional timing circuits that ensure the coincidence of two edges, rather than the equality of two intervals.

The availability of the skew detector enables a switching voltage controller to adjust timing until DT1 and DT2 are equal, ensuring that subsequent adjustments of the individual dead times can be orthogonal and thus providing optimal operation of any timing algorithm. The sensor need only be active during the beginning of a calibration sequence, and turned off at other times to minimize energy usage and improve efficiency. The resulting skew signal (error signal) should be relatively insensitive to variations in process performance, supply voltage, and operating temperature, and to asymmetries in the rising and falling edges of the respective switches.

It is apparent that the voltage at the switching node $V_{SW}$ cannot readily be used for this purpose, because the load current influences this voltage. For example, measurement of the switching voltage cannot easily distinguish between the sequence where SW1 turns off and SW2 turns on immediately thereafter, and the case where SW1 turns off while SW2 is off, but the node potential is drawn towards ground by the output current through the inductor.

Figure 4:
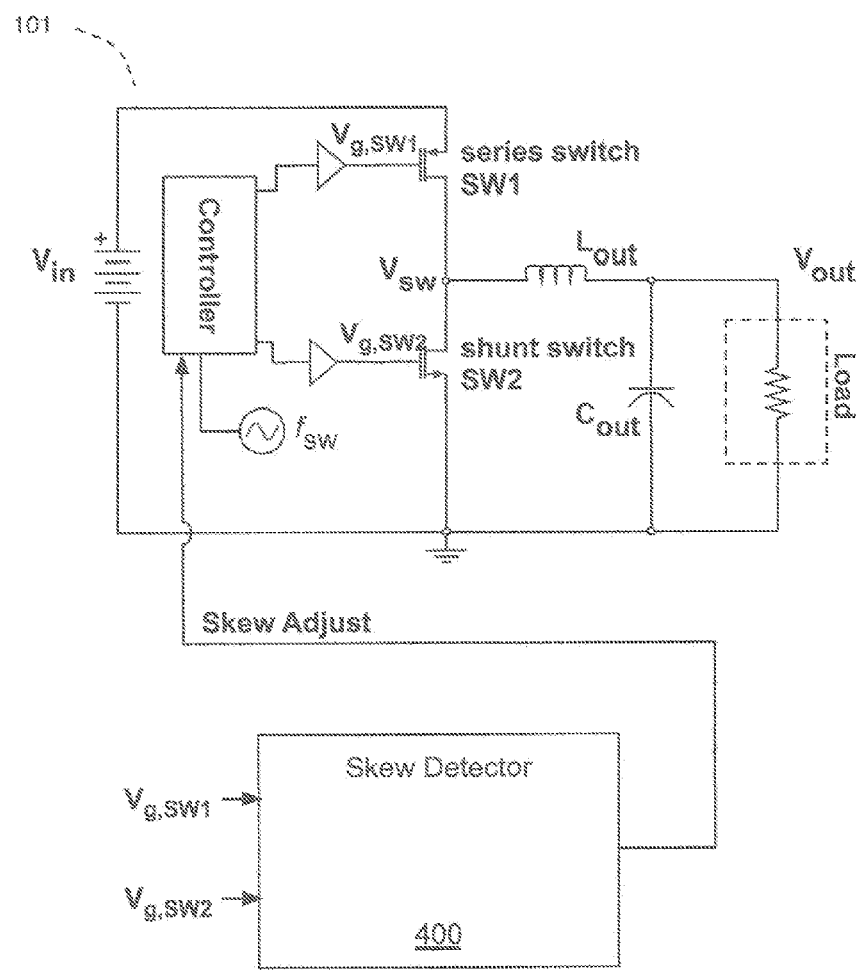
FIG. 4 shows an example of a block diagram of a switched voltage regulator that includes a controller for generating an error signal proportional to a relative displacement of an on-interval of the series switch and an off-interval of the shunt switch.

FIG. 4 shows an example of a block diagram of a switched voltage regulator that includes a skew detector 400 for generating an error signal proportional to a relative displacement of an on-interval of a series switch (SW1) and an off-interval of a shunt switch (SW2). The skew detector 400 receives control signals ($V_{g,SW1}$, $V_{g,SW2}$) of both the series switch (SW1) and the shunt switch (SW2). It is to be understood that generating the error signal proportional to the relative displacement of an on-interval of the shunt switch and an off-interval of the series shunt switch is an equivalent implementation. That is, as is readily apparent by observation of the timing diagrams, one implementation is an equivalent implementation of the other.

As will be described, embodiments of the skew detector 400 generate an error signal (skew adjust) that is fed back to the controller 420 for adjusting a relative delay of the series switch control signal ($V_{g,SW1}$) and the shunt switch control signal ($V_{g,SW2}$) based on the error signal.

The switching controller 420 is operative to generate a switching voltage ($V_{SW}$) through closing and opening of a series switch (SW1) and a shunt switch (SW2) as controlled by the series switch control signal ($V_{g,SW1}$) and the shunt switch control signal ($V_{g,SW2}$). The switch controller is further operative to adjust a relative delay of the series switch control signal ($V_{g,SW1}$) and the shunt switch control signal ($V_{g,SW2}$) based on the error signal. The voltage regulator generates a regulated output voltage ($V_{out}$) based upon the switching voltage ($V_{SW}$).

Figure 5:
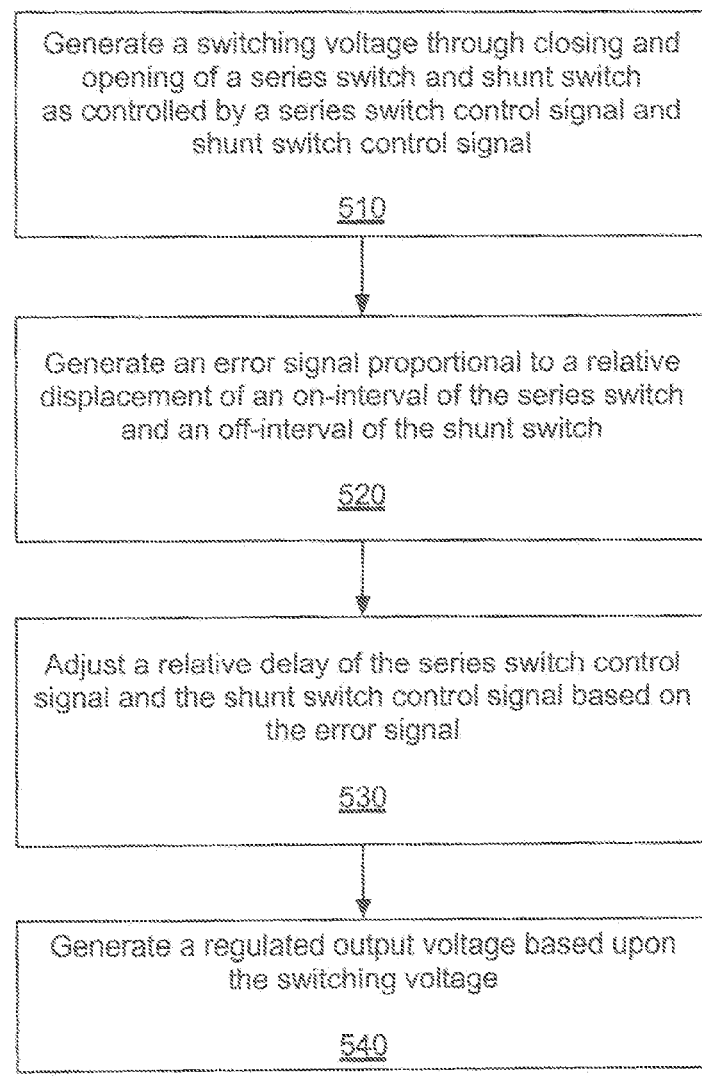
FIG. 5 is a flow chart that includes steps of an example of a method of controlling a skew time of switches of a switching voltage regulator.

FIG. 5 is a flow chart that includes steps of an example of a method of controlling a skew time of switches of a switching voltage regulator. A first step 510 includes generating a switching voltage through closing and opening of a series switch and a shunt switch as controlled by a series switch control signal and a shunt switch control signal. A second step 520 includes generating an error signal proportional to a relative displacement of an on-interval of the series switch and an off-interval of the shunt switch. A third step 530 includes adjusting a relative delay of the series switch control signal and the shunt switch control signal based on the error signal. A fourth step 540 generating a regulated output voltage based upon the switching voltage.

For an embodiment, the series switch control signal and the shunt switch control signal include dead times in which the series switch and the shunt switch are turned off, wherein a first dead time (DT1) is defined by a period of time in which the shunt switch has just entered its off-interval, but the series switch has not yet entered its on-interval, and a second dead time (DT2) is defined by a period of time in which the series switch has just entered it off-interval and the shunt switch has not yet entered its on-interval.

The error signal is dependent upon the first dead time (DT1) and the second dead time (DT2). For an embodiment, this includes a sign of the error signal changing when a relative magnitude of DT1 changes from less than to greater than a magnitude of DT2. For an embodiment, the error signal is minimized when DT1 is approximately equal to DT2.

An embodiment further includes adjusting the error signal with an offset to intentionally adjust DT1 to not be equal to DT2. For an embodiment, the offset is adaptively selected to improve efficiency of the switching converter by adjusting DT1 and DT2, wherein a sum of DT1+DT2 is a fixed value. For an embodiment, the error signal reaches a target value when the on-interval of the series switch is delayed relative to the off-interval of the shunt switch by a desired amount.

For an embodiment, the error signal is generated by a current skew detector, wherein the current skew detector includes a dual phase detector, a charge pump circuit, and a difference circuit. A more specific embodiment of the current skew detector further includes an input level shifter for one of the series switch control signal and a shunt switch control signal, and an input time delay block for the other of the series switch control signal and a shunt switch control signal. For an alternate embodiment, the error signal is generated by a current skew detector, wherein the current skew detector includes a switched signal phase detector, a charge pump circuit, and a low pass filter.

For an embodiment, the error signal is generated by the charge pump, and the charge pump is only active during the dead times DT1, DT2. For an embodiment, the error signal comprises pulses corresponding to the dead times DT1, DT2.

For an embodiment, the dual phase detector includes symmetric interval detection for providing insensitivity of the error signal to asymmetry of rising and falling edges of the series switch control signal and a shunt switch control signal.

Figure 6:
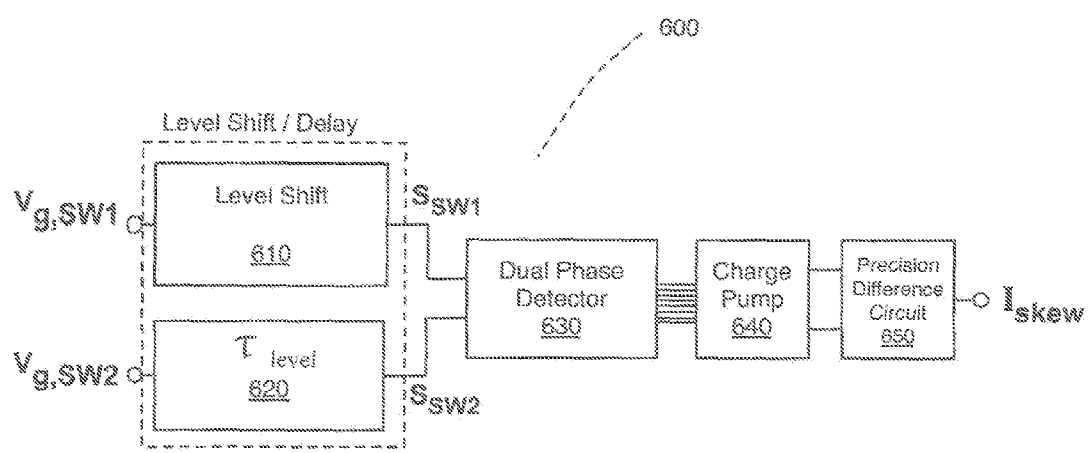
FIG. 6 shows a block diagram of an example of a skew detector

FIG. 6 shows a block diagram of an example of a skew detector 600, such as, the skew detector 400 of FIG. 4. The control signals ($V_{g,SW1}, V_{g,SW2}$) that are applied to the gates of the actual switches SW1 and SW2 are also directed to the inputs of the skew detector 600. The SW1 input $V_{g,SW1}$ is level-shifted (level shift block 610) and inverted, to produce a logical signal $S_{SW1}$ that is logic-high (e.g. 1.8 V) when SW1 is on, and referenced to ground when SW1 is off. The SW2 control signal is already referenced to ground when SW2 is off, and high when SW2 is on, so it need merely be delayed (by delay block 620) to match the level-shifting delay in order to produce the second logical signal $S_{SW2}$.

The two control signals are then passed to, for example, a dual phase detector block 630. This block 630 responds separately to the conditions corresponding to the two distinct dead times (DT1, DT2). One output is determined by the relationship of the rising edge of $S_{SW1}$ and the falling edge of $S_{SW2}$ (the interval between these events being DT1). The second output is determined by the relationship of the falling edge of $S_{SW1}$ and the rising edge of $S_{SW2}$ (the interval being DT2). A charge pump is then used to symmetrically subtract both the dead time signals, and their complements, to provide a difference current $I_{skew}$, which is approximately 0 when the dead times DT1 and DT2 are equal, substantially independent of variations in process performance, supply voltage, and temperature.

Figure 7:
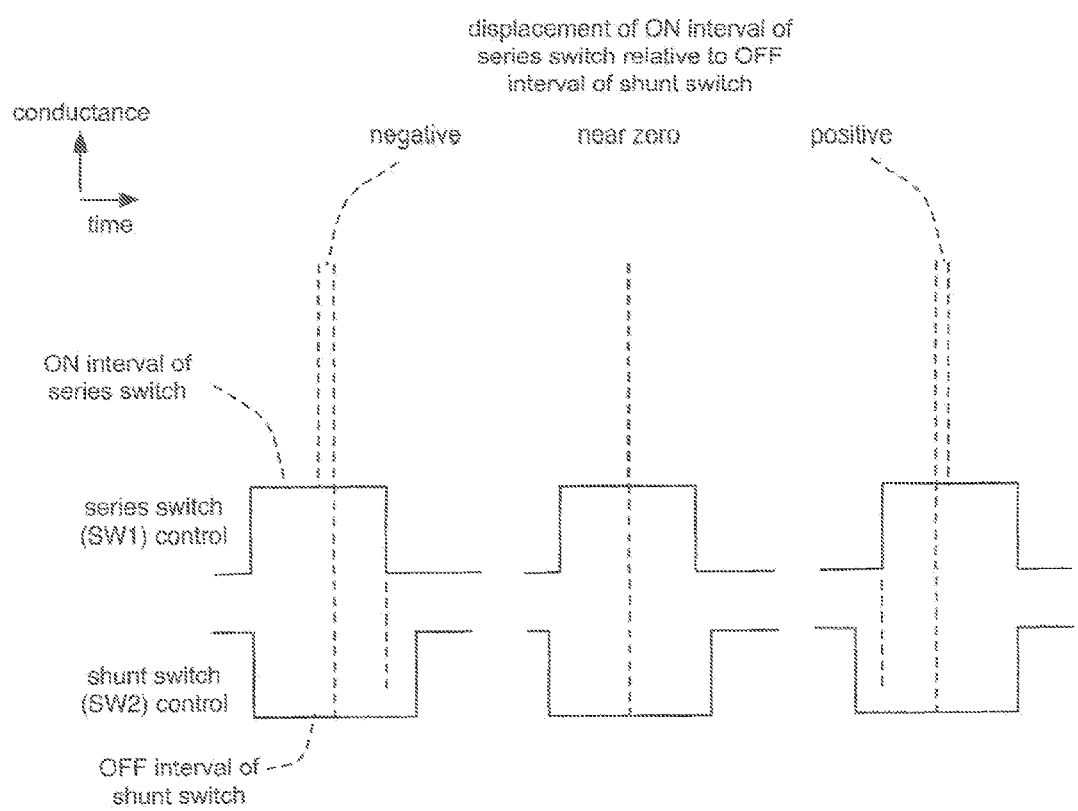
FIG. 7 shows timing diagrams that shows examples of timing of a series switch control signal and a shunt switch control signal.

FIG. 7 shows timing diagrams depicting an example of timing of a series switch control signal and a shunt switch control signal. As shown, the series switch control signal (SW1) and the shunt switch control signal (SW2) include both on periods and off periods. As described, the dead times DT1, DT2 are portions of the control signals where both SW1 and SW2 are off. As described, the error signal is generated proportional to a relative displacement of an on-interval of the series switch and an off-interval of the shunt switch, or equivalently, proportional to a relative displacement of an off-interval of the series switch and an on-interval of the shunt switch. By centering the control signals by minimizing the relative displacement, the dead times DT1 and DT2 are made approximately equal. While the timing diagrams of FIG. 7 show the overlap of the control signals being all positive (that is, no shoot-through), it is to be understood that the overlap between the control signals can be negative (that is, include shoot-through).

A first set 710 of series switch and shunt switch control signals include the center of the ON interval of the series switch control signal occurring before the center of the OFF interval of the shunt switch control signal. These control signals can be designated as having a negative relative displacement of on-interval of the series switch and an off-interval of the shunt switch. A second set 720 of series switch and shunt switch control signals include the center of the ON interval of the series switch control signal occurring at nearly the same time as the center of the OFF interval of the shunt switch control signal. These control signals can be designated as having a near zero relative displacement of on-interval of the series switch and an off-interval of the shunt switch. A third set 730 of series switch and shunt switch control signals include the center of the ON interval of the series switch control signal occurring after the center of the OFF interval of the shunt switch control signal. These control signals can be designated as having a positive relative displacement of on-interval of the series switch and an off-interval of the shunt switch. As described, the embodiments for controlling a skew time of switches of a switching voltage regulator include generating an error voltage to adjustably control the relative displacement of on-interval of the series switch and an off-interval of the shunt switch. A specific embodiment includes generating the error voltage to minimize the displacement, as shown by the second set 720.

Figure 8:
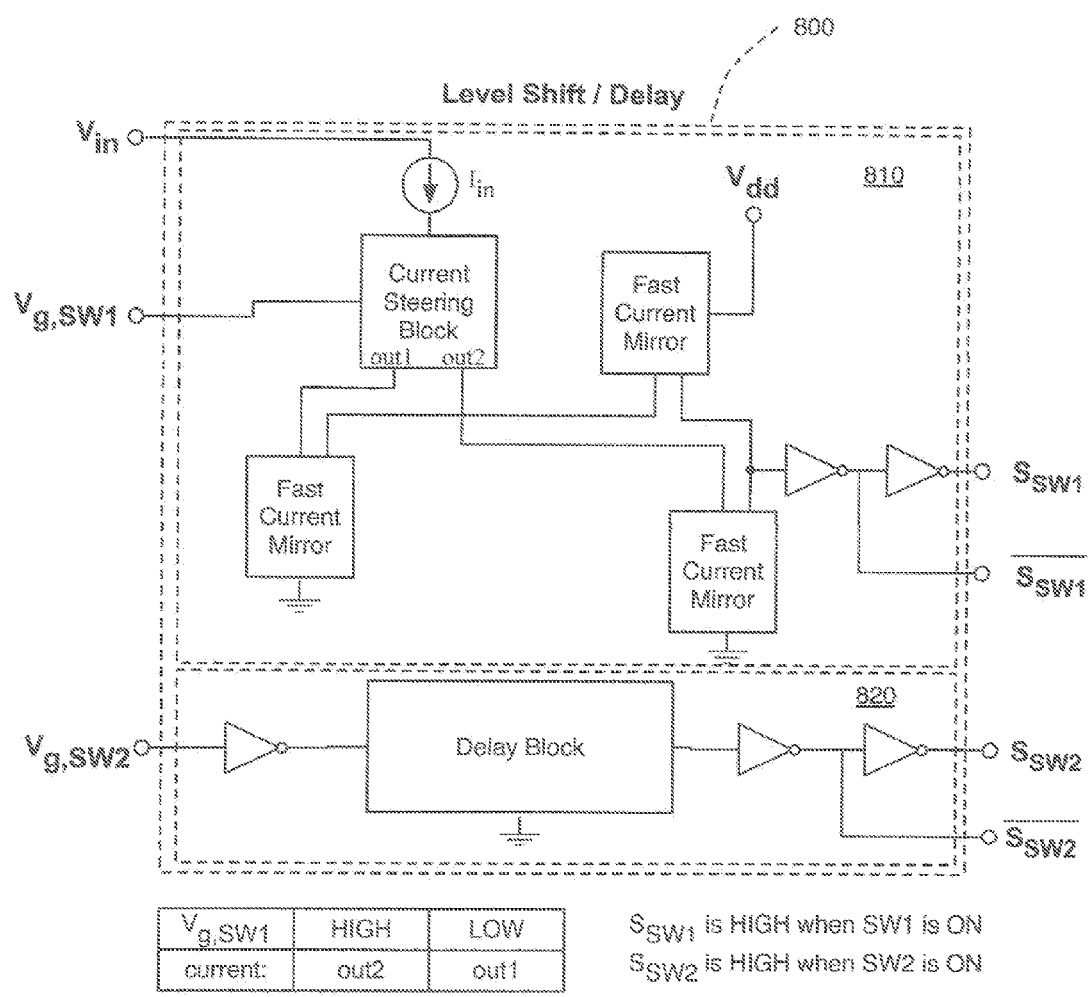
FIG. 8 shows a block diagram of an example of an embodiment of a signal level shift and delay block of the controller of FIG. 6.

FIG. 8 shows a block diagram of an example of an embodiment of a signal level shift and delay block of FIG. 6. High-speed converters generally produce substantial voltage transients (spikes), leading to an electrically noisy on-chip environment. Cross-coupled level shifting circuits rely on positive feedback to induce state transitions, and are therefore sensitive to small variations in input voltage near threshold. In noisy environments, the level shifter produces substantial additional jitter, undesirable for accurate relative timing. Therefore, embodiments of linear level shifting can be preferred.

The embodiment of FIG. 8 includes a level shift block 810 and a delay block 820. This embodiment of a level shift block 810 accepts the gate input to SW1, $V_{g,SW1}$. This voltage is used to switch a fixed input current between two branches, each containing a fast current mirror (described in more detail below). The mirrored currents are used to provide level-shifted inputs to a high-impedance node (the input of a buffer amplifier), whose output is an inverted version of the input signal $V_{g,SW1}$, shifted to suitable logic levels for further processing. This output is inverted twice in order to extract the logical complement of $S_{SW1}$ for use in the next block.

This embodiment of a delay block 820, includes delaying the input voltage to SW2, $V_{g,SW1}$, to maintain synchrony with the level shifted SW1 input. A final inverter pair is again employed to provide the logical complement of the delayed signal $S_{SW2}$.

Figure 9:
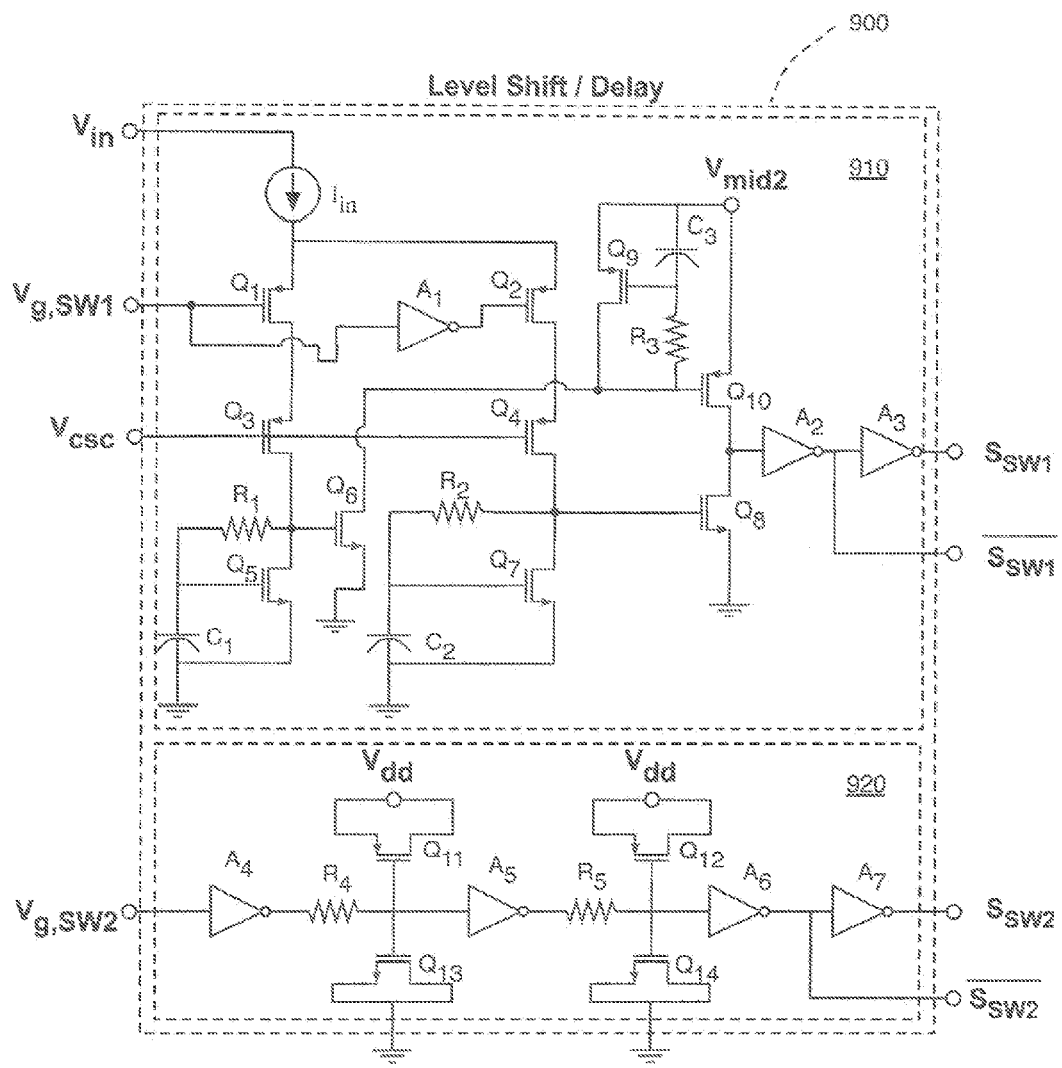
FIG. 9 shows a circuit diagram of an example of a more detailed embodiment of a signal level shift and delay block of the controller of FIG. 6.

FIG. 9 shows a circuit diagram of an example of a more detailed embodiment of the signal level shift (910) and the delay block (920) of the controller of FIG. 6. This exemplary embodiment of the level-shift/delay circuit for a converter uses a 35-MHz switching frequency, implemented in conventional CMOS technology, though this approach can work for any switching frequency. The input voltage $V_{g,SW1}$ is both applied to a PMOS FET $Q_1$ that is a reduced-size replica of the main switching devices, and is inverted by buffer amplifier $A_1$ and applied to a second replica $Q_2$. Note that buffer amplifier $A_1$ in this case is powered by $V_{in}$ and uses the intermediate voltage $V_{mid1}$ as its reference (ground) voltage. A separate circuit, not shown here, provides appropriate fixed bias voltages for the cascode FETs that allow implementation in a low-voltage process. (Single devices without cascodes may also be employed when the device properties allow reliable operation under the maximum expected voltage stress.) The replica devices act to direct the input current to the right branch when $V_{g,SW1}$ is equal to $V_{IN}$, and to the left branch when $V_{g,SW1}$ is equal to $V_{mid1}$.

The current from each branch is directed to a modified current mirror. For example, the left branch current flows to a mirror composed of transistors $Q_5$ and $Q_6$, with filter elements $R_1$ and $C_1$. At DC, since the gate current of the MOS device is negligible, $Q_5$ can be considered as a diode-connected FET, supplying whatever current is needed to satisfy the current steering transistors $Q_1$ and $Q_3$. However, in transient operation, the gate of $Q_5$ is temporarily held at the previous level by the capacitor $C_1$, while the drain voltage may substantially differ from the gate voltage due to the presence of the resistor $R_1$. For example, if a small current had been flowing in $Q_5$, the gate voltage would be close to the threshold voltage. When the current suddenly increases, the gate voltage is held low by $C_1$, so the drain voltage rises until the excess current is absorbed by a combination of the drain conductance of $Q_5$ and the charging current flowing through $R_1$ to $C_1$. This increase of the drain voltage acts to rapidly charge the gate of $Q_6$ resulting in a rapid rise in the current delivered through it to $Q_9$ and $Q_{10}$, using only a small current $I_{in}$. In the absence of the gate filter elements, the gates of $Q_5$ and $Q_6$ would charge slowly, which is undesirable in a circuit whose purpose is to replicate the edges of $V_{g,SW1}$. With the enhanced mirror design, $I_{IN}$ of 250 microamps is sufficient to provide rise and fall times suitable for switching frequency of 35 to 50 MHz. Values of the individual resistors and capacitors, as well as the bias current can be adjusted for operation at other switching frequencies.

In an embodiment, source resistors may be added to the mirror transistors (e.g. $Q_5$) to optimize response speed with minimal ringing.

The mirror FET $Q_6$ is directed to a similarly enhanced current mirror composed of $Q_9$ and $Q_{10}$. Thus, when the input $V_{g,SW1}$ is low (equal to $V_{mid1}$), $Q_{10}$ is on, and the input to the buffer amplifier $A_2$ is high (equal to $V_{mid2}$, the logic high level).

Similarly, current steering replica $Q_2$ and cascode $Q_4$ send current to mirror transistors $Q_7$ and $Q_8$. Thus, when the input $V_{g,SW1}$ is high (equal to $V_{in}$), transistor $Q_8$ is on and the input of buffer amplifier $A_2$ is pulled to ground. Buffer amplifiers $A_2$ and $A_3$ together provide both the output $S_{SW1}$ and its logical complement. There is a slight discrepancy in timing of the outputs, amounting to about 50 psec in the embodiment discussed here, but since the same discrepancy occurs in $S_{SW2}$, it has negligible effect on the efficacy of the overall circuit, due to provisions for offset removal described below.

In the delay portion of the circuit, $V_{g,SW1}$, is buffered by amplifier $A_4$. The PMOS transistor $Q_{11}$ and NMOS transistor $Q_{13}$ together act as a voltage-independent capacitor, which combined with a resistor $R_4$ contribute a substantially fixed delay. This scheme is replicated with $A_5$, $R_5$, $Q_{12}$ and $Q_{14}$. The number of R-C delays and buffers are selected to roughly reproduce the proportion of passive-controlled and active-controlled delays in the level shift portion of the circuit, so that the delays encountered in producing $S_{SW1}$ and $S_{SW2}$ are equal over expected variations in temperature and supply voltage, as well as in transistor and resistor processing. Other methods of generating delay might be employed, such as a series of inverters.

Figure 10:
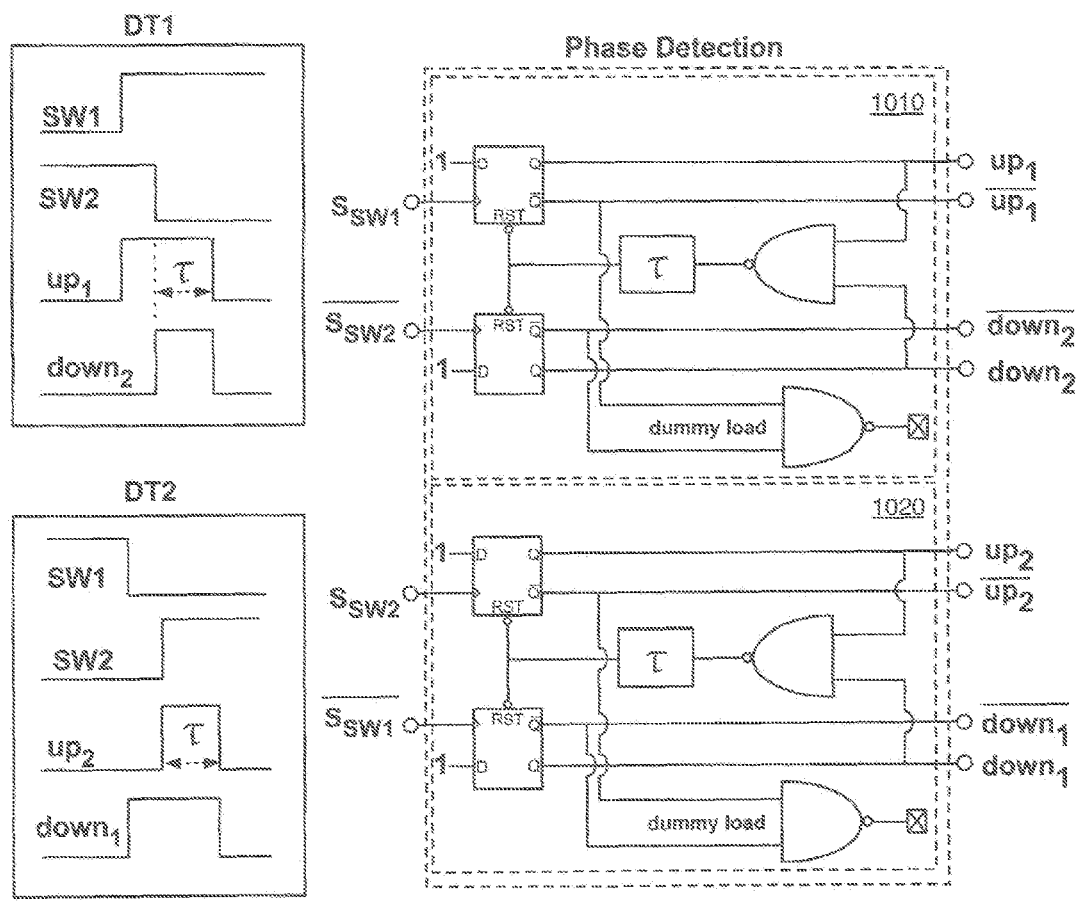
FIG. 10 shows a circuit diagram of an embodiment of a dual phase detector of FIG. 6.

FIG. 10 shows a circuit diagram of an embodiment of a dual phase detector of FIG. 6. For an embodiment, the resulting outputs of the level shift and delay circuits of, for example, FIG. 9, are directed to a pair of phase detectors 1010, 1020, shown in 10. These phase detectors 1010, 1020 act to provide outputs corresponding to the rising and falling edges of the switch signals. The phase detectors 1010, 1020 are arranged to produce outputs proportional to the respective dead times.

The individual phase detectors 1010, 1020 are substantially conventional. Each input signal acts as the clock for a D flip-flop. A NAND gate resets both flip-flops a fixed delay after both the UP and DOWN signals go high. A dummy load is provided on the complementary outputs to ensure that the rise and fall times for both true and complementary edges are equal. In the configuration shown, the top phase detector responds to the relative timing of the rising edge of $S_{SW1}$ and the falling edge of $S_{SW2}$ (obtained by using the rising edge of the logical complement), corresponding to the outputs $up_1$ and $down_2$. The complementary outputs are also provided for use in the charge pump, as will be described below.

The delay τ is provided to ensure well-defined short-duration pulses to preserve linearity and accuracy. The delay value is chosen to be equal to or greater than the rise times of the circuitry (here typically 100-200 psec) but short compared to the clock period (here typically 28-30 nsec at 35 MHz). The use of short-duration pulses ensures that small discrepancies in absolute current between the detectors do not result in excessive output offsets.

The bottom phase detector 1020 responds to the relative timing of the rising edge of $S_{SW2}$ and the falling edge of $S_{SW1}$ (obtained by using the rising edge of the logical complement); corresponding respectively to outputs $down_1$ and $up_2$. Complementary outputs are provided as noted previously.

Figure 11:
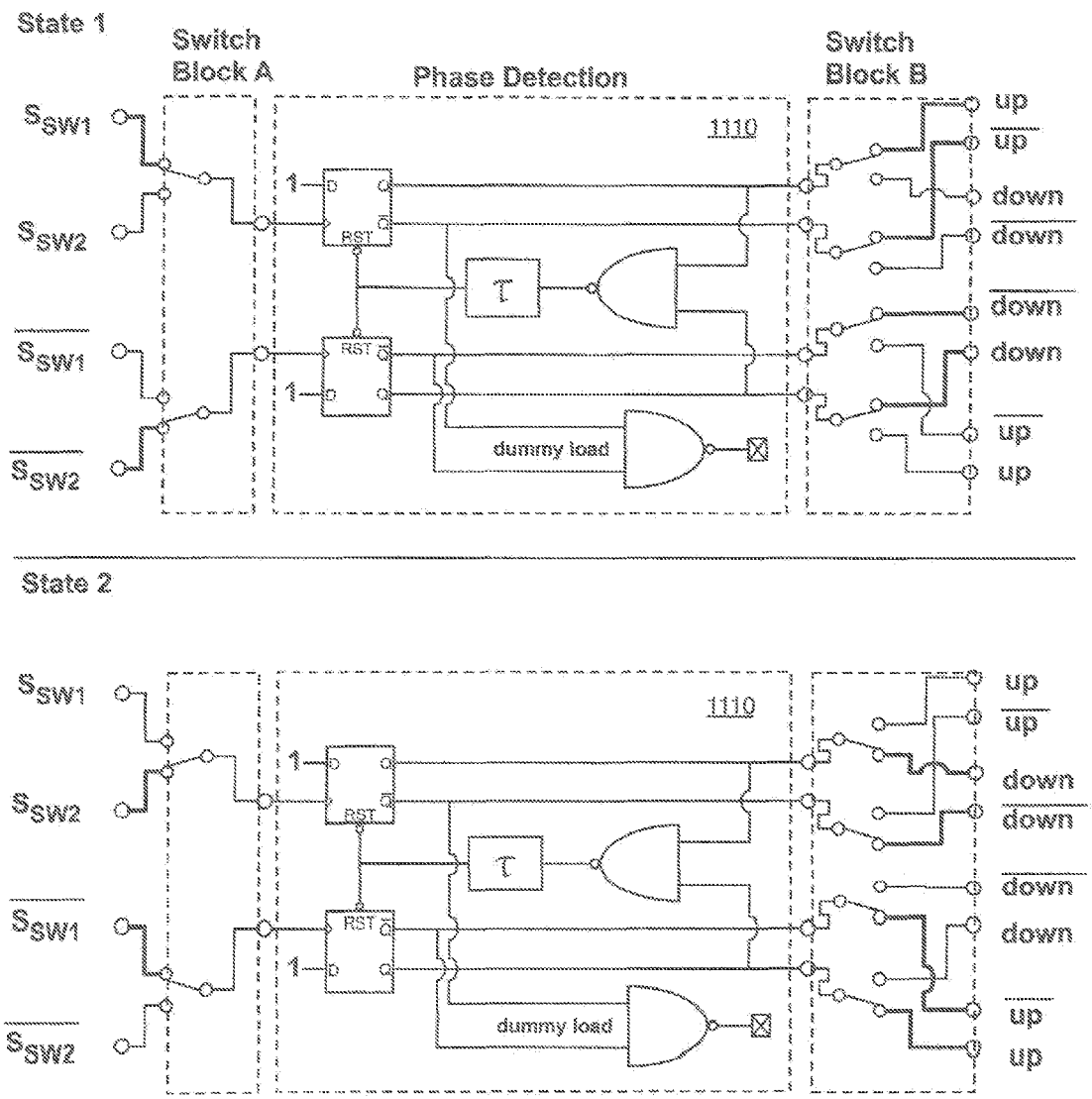
FIG. 11 shows a circuit diagram of an embodiment of a switched signal phase detector which can be utilized as an alternate embodiment instead of the dual phase detector.

FIG. 11 shows a circuit diagram of an embodiment of a switched signal phase detector which can be utilized as an alternate embodiment instead of the dual phase detector. This embodiment includes a single phase detector 1110 which operates in a state 1 or a state 2 as determined by settings of input switches and output switches.

Figure 12:
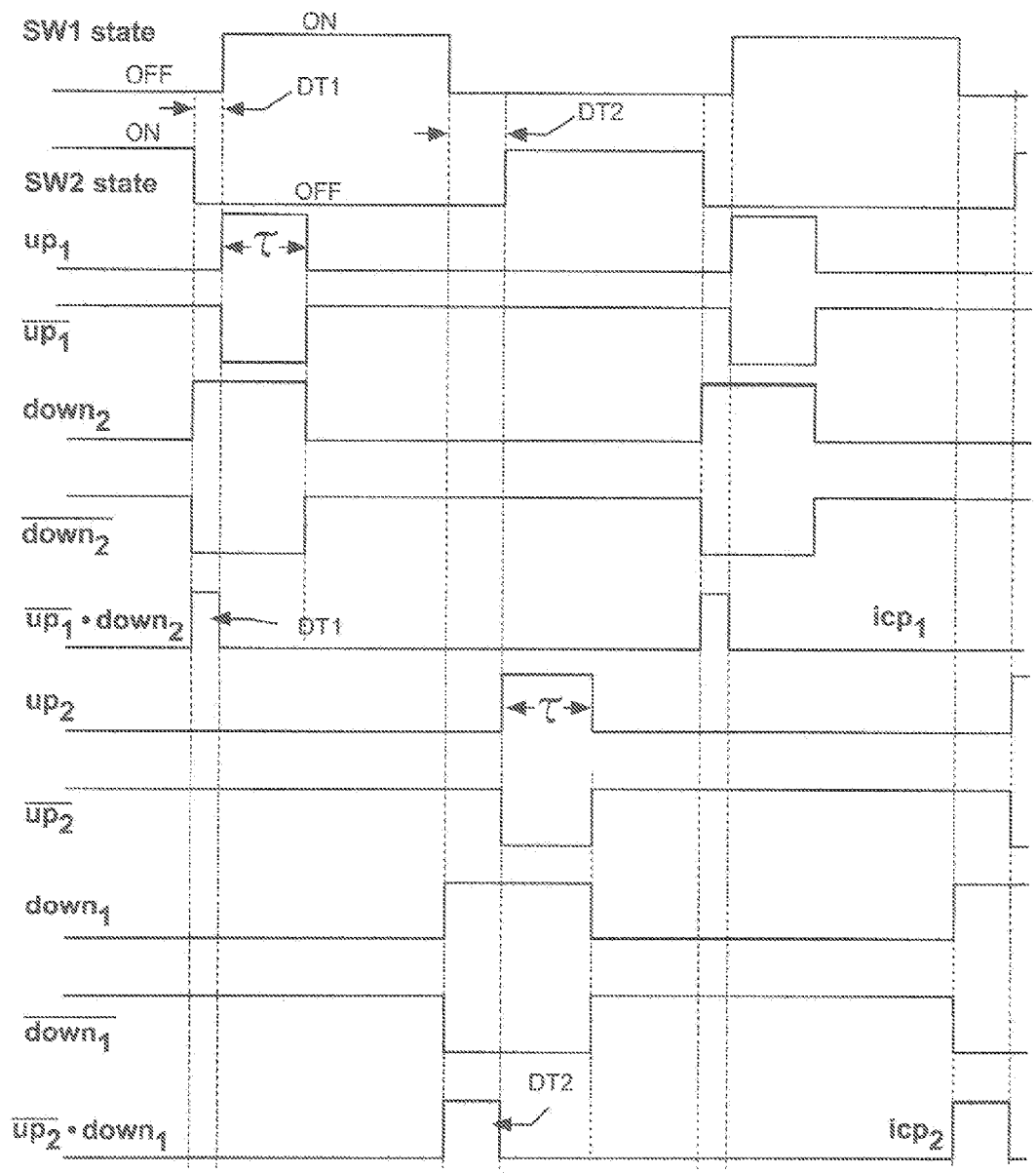
FIG. 12 shows an example of a timing diagram of signals of the dual phase detector of FIG. 10

FIG. 12 shows an example of a timing diagram of signals of the dual phase detector of FIG. 10. FIG. 12 shows the timing relationships between these outputs and the nominal switching states. (Note that the absolute delay between the switch states and the corresponding outputs of the phase detector is irrelevant, as long as it is constant for all the outputs, and thus is not shown here for simplicity.) It can be seen that:

$DT1 = \overline{up_1}$ AND $down_2$ $DT2 = \overline{up_2}$ AND $down_1$

To determine the difference between the dead times (DT1, DT2), it is therefore necessary to take the difference of these quantities. To make the result first-order insensitive to offsets between the rising and falling edges of the switches, it is further desirable to take the difference of the complementary quantities. In an embodiment, the interval of DT1 would result in a positive output current pulse icp1, and the interval DT2 would result in a positive output current pulse icp2. The resultant output is determined by the difference of icp1 and icp2. If DT1 and DT2 are equal, the resulting difference current would be zero.

Figure 13:
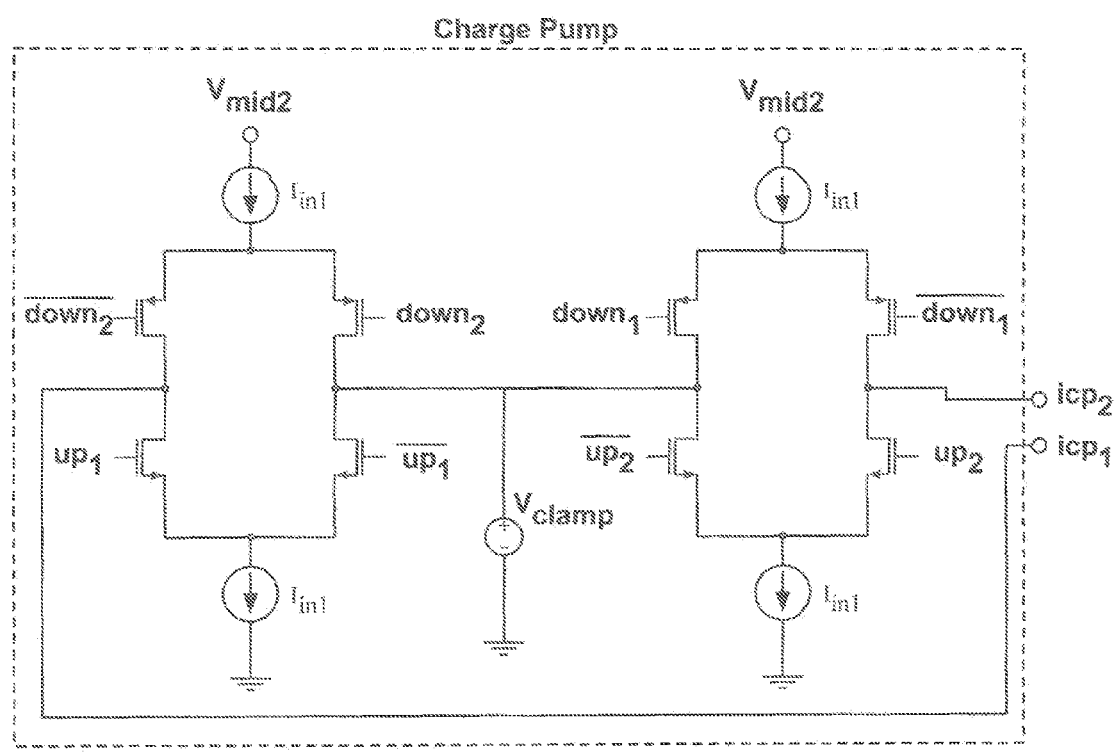
FIG. 13 shows an example of a circuit of a charge pump of FIG. 6.

FIG. 13 shows an example of a circuit of the charge pump of FIG. 6. This charge circuit performs the requisite summation. The voltage signals $up_1$, $up_2$, $down_1$, $down_2$, and their logical complements, are directed to differential pairs. Each differential pair receives a current source and is directed to a current sink, both of equal magnitude $I_{in1}$. One side of each differential pair is connected to an output of the charge pump block, $icp_1$ and $icp_2$. The other side is connected to a common clamp voltage $V_{clamp}$. In an embodiment the clamp voltage of around 0.8 V may be formed using a diode through which is directed a current source, but any other means of producing a compliant voltage source may be employed.

The charge pump circuit of FIG. 13 works as follows. Focusing first on the left-side pair, the output current is:

$\overline{down_2}$ LOW and $up_1$ LOW → $icp_1 = I_{in1}$ $\overline{down_2}$ HIGH and $up_1$ HIGH → $icp_1 = -I_{in1}$ ELSE $icp_1 = 0$ Referencing FIG. 13 suggests that the first case corresponds to the time when SW2 has turned off but SW1 is not yet on, that is, to the interval DT1. The second case applies only if SW1 turns on BEFORE SW2 turns off. This is a shoot-through condition (and generally to be avoided), but from the point of view of timing, it corresponds to a negative dead time DT1<0, and thus a negative current to $icp_1$ is appropriate. The right side of the pair provides complementary signals, so that a path is available to the current source and sink, regardless of the state of the inputs.

Similarly, the right hand differential pair provides the output currents:

$\overline{down_1}$ LOW and $up_2$ LOW → $icp_2 = I_{in1}$ $\overline{down_1}$ HIGH and $up_2$ HIGH → $icp_1 = -I_{in1}$ ELSE $icp_1 = 0$ Referencing FIG. 13 suggests that the first case corresponds to the time when SW1 has turned off but SW2 is not yet on, that is, to the interval DT2. The second case applies only if SW2 turns on BEFORE SW1 turns off, again indicating a negative DT2 value (shoot-through). Therefore the outputs of the charge pump block consist of current pulses of fixed magnitude on $icp_1$ and $icp_2$, whose duration corresponds respectively to the duration of DT1 and DT2, and whose polarity indicates the sign of the respective dead time. The current sources labeled $I_{n1}$ are presumed to have the same value of output current.

Figure 14:
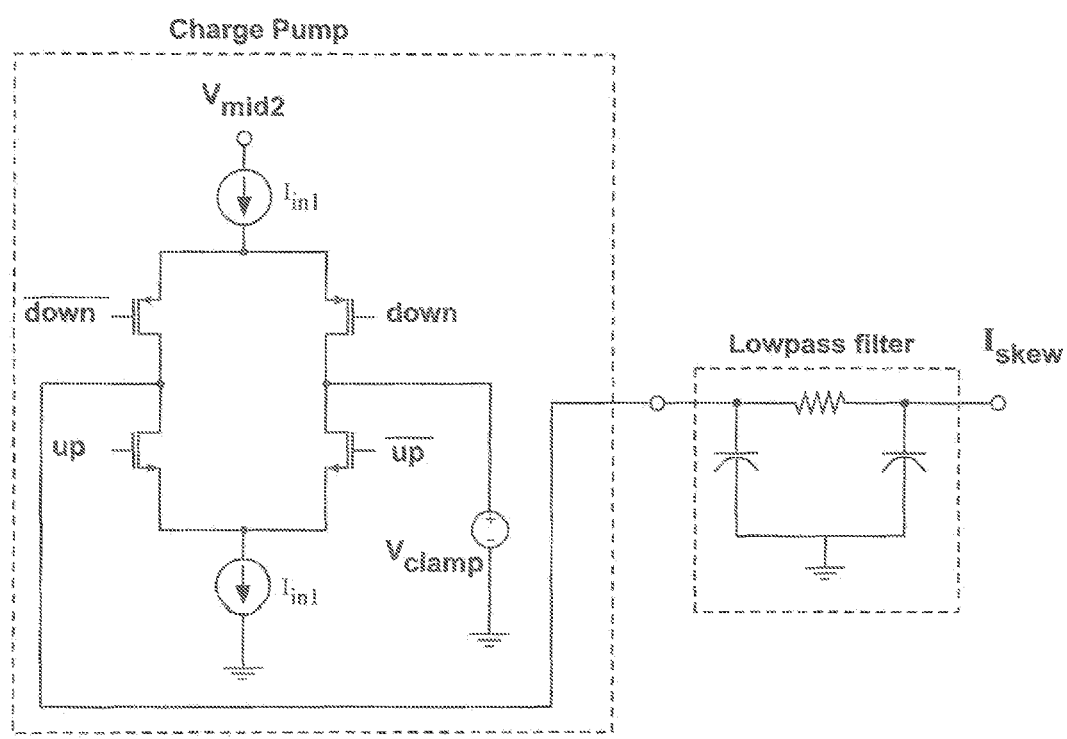
FIG. 14 shows an example of a circuit of a charge pump that can be utilized in conjunction with the switched signal phase detector of FIG. 11.

FIG. 14 shows an example of a circuit of a charge pump that can be utilized in conjunction with the switched signal phase detector of FIG. 11. As can be observed, this implementation of the charge pump may be simpler than the implementation of the charge pump shown in FIG. 13.

Figure 15:
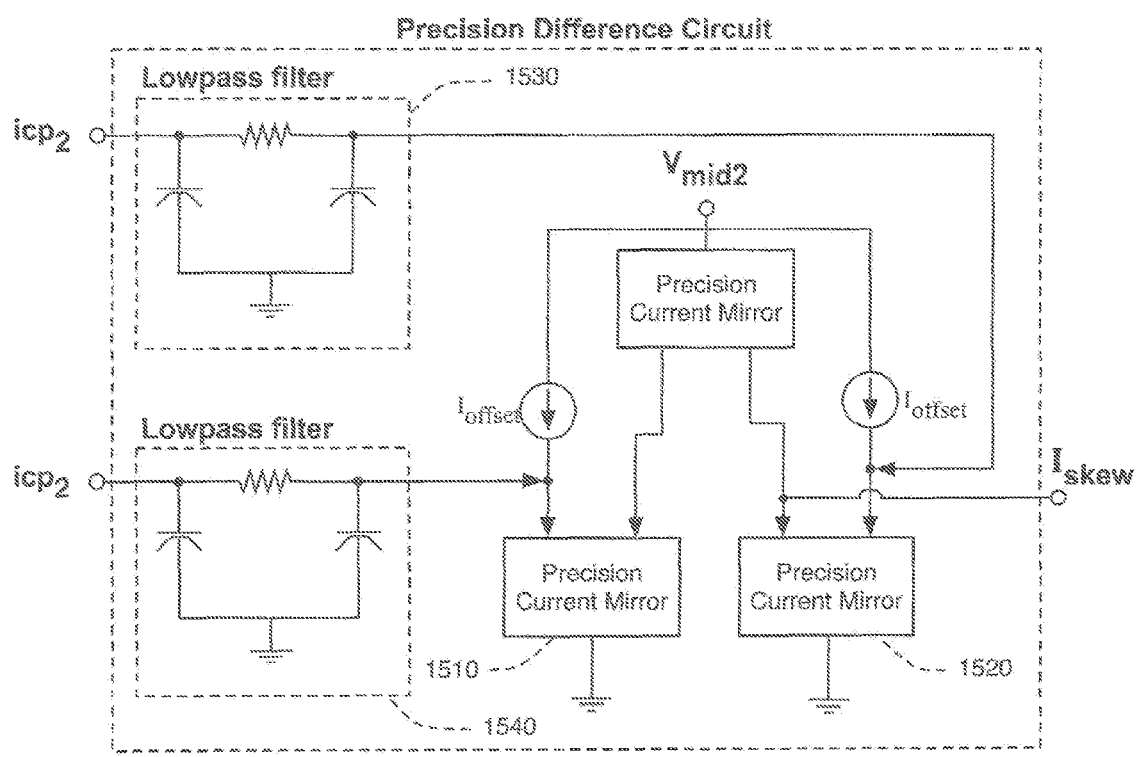
FIG. 15 shows an example of a precision differencing circuit of FIG. 6.

FIG. 15 shows an example of a precision differencing circuit of FIG. 6. The two currents ($icp_1$, $icp_2$) are filtered, and then sent to a differential, low-offset, current differencing circuit. Each current passes through a low-pass filter (1530, 1540) with a characteristic time equal to a few times longer than the switching cycle $1/f_{SW}$. The filtered currents are directed to precision current mirrors 1510, 1520. When the two skew times, DT1 and DT2, are very short, the low pass-filtered currents output by the charge-pump can be very small, due to the inherent short-duration pulses produced within the charge pump. In order to keep the precision current differencing circuit operating in a normal regime far from the off condition, matched input offset currents are connected to each input. The offset currents ensure that the internal circuitry of the precision current mirrors 1510, 1520 are always on, and ensure accuracy. Other embodiments of precision current differencing circuits, such as those employing negative feedback, can be also be utilized.

Figure 16:
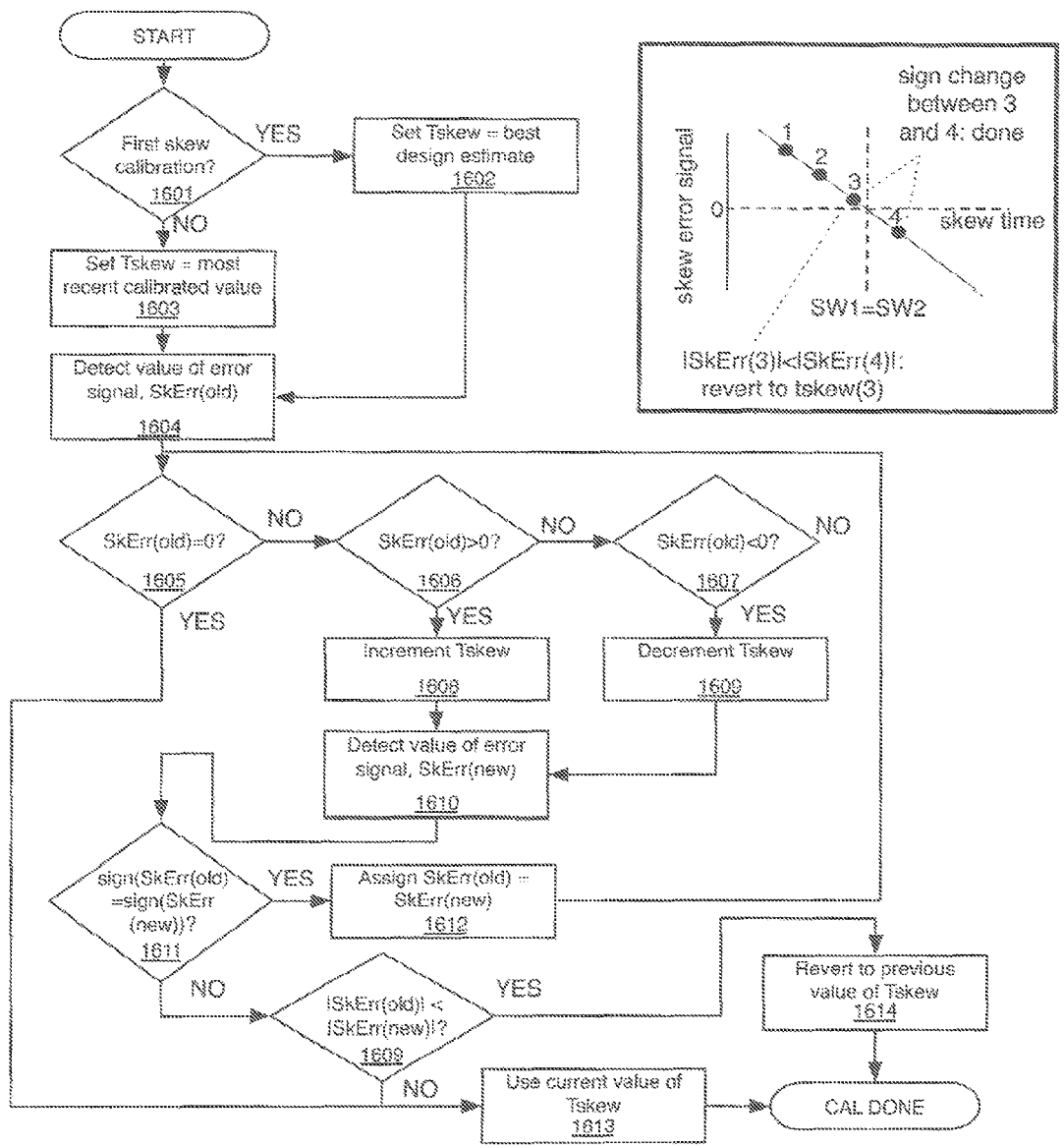
FIG. 16 is a flow chart that shows steps of an example of a method of selecting a skew time between a series switch control signal and a shunt switch control signal.

FIG. 16 is a flow chart that shows steps of an example of a method of selecting a skew time (Tskew) between a series switch control signal and a shunt switch control signal. The inset graph shows a simple example demonstrating how the procedure works. The skew time calibration procedure initially sets the skew time to the most recent value if available; for the very first calibration, the skew time is set to the best estimate from e.g. the design process. In this example, the skew time corresponding to test point 1 is first tested, producing an error signal >0, indicating that the skew time should be incremented. The procedure proceeds through points 2 and 3, each time detecting a positive error and incrementing the skew time. Between points 3 and 4 a sign change is found, signifying that the zero-error value lies between points 3 and 4. The procedure then tests to see which error has the smaller absolute value; if the penultimate rather than the final point tested has the smallest absolute error, the skew time is reverted to the time corresponding to the penultimate point.

A step 1601 includes determining if the present calibration is the first, or if there has been a previous calibration. If yes, that is the present is the first calibration, a best design estimate can be used as an initial Tskew (step 1602). If a previous calibration has been performed, then the most recent value of Tskew per the last calibration can be used (step 1603). The error signal (SkErr(old)) can be determined based on the prior Tskew (step 1604). The error signal is sensed (step 1605) and if zero (at least within a minimum threshold value) then the current value of Tskew can be maintained (step 1613), and if not zero (or not within the minimum threshold value), then the error signal is determined to be greater than zero (step 1606) or less than zero (step 1607). As shown, if error signal is greater than zero (step 1606), then Tskew is incremented (step 1608), and if the error signal is less than zero (step 1607) then Tskew is decremented (step 1609). The error signal is then detected again (SkErr(new)) (step 1610), and a sign of the new error signal (SkErr(new)) is compared with the sign of the previous error signal (SkErr(old)) (step 1611). If the signs are the same, then SkErr(old) is replaced with SkErr(new) (step 1612), and SkErr(old) is again checked to determine if it is zero (step 1605). If the signs are different, then the value of SkErr(old) is compared with the value of SkErr(new) (step 1615). If SkErr(old) is greater than SkErr(new), then the current value of Tskew is used (step 1613). If SkErr(old) is less than SkErr(new), then the previous value of Tskew is used (step 1614).

Although specific embodiments have been described and illustrated, the embodiments are not to be limited to the specific forms or arrangements of parts so described and illustrated.

What is claimed:

1. A method of controlling a skew time of switches of a switching voltage regulator comprising:
    generating a switching voltage through closing and opening of a series switch and a shunt switch as controlled by a series switch control signal and a shunt switch control signal;
    generating an error signal proportional to a relative displacement of an on-interval of the series switch and an off-interval of the shunt switch, wherein the error signal is generated based on a gate voltage of the series switch and a gate voltage of the shunt switch;
    adjusting a relative delay of the series switch control signal and the shunt switch control signal based on the error signal; and
    generating a regulated output voltage based upon the switching voltage.

2. The method of claim 1, wherein series switch control signal and a shunt switch control signal comprise dead times in which the series switch and the shunt switch are turned off, wherein a first dead time (DT1) is defined by a period of time in which the shunt switch has just entered its off-interval, but the series switch has not yet entered its on-interval, and a second dead time (DT2) is defined by a period of time in which the series switch has just entered its off-interval and the shunt switch has not yet entered its on-interval.

3. The method of claim 2, wherein the error signal is dependent upon the first dead time (DT1) and the second dead time (DT2).

4. The method of claim 3, wherein a sign of the error signal changes when a relative magnitude of DT1 changes from less than to greater than DT2.

5. The method of claim 3, wherein the error signal reaches a target value when the on-interval of the series switch is delayed relative to the off-interval of the shunt switch by a desired amount.

6. The method of claim 2, wherein the error signal is minimized when DT1 is approximately equal to DT2.

7. The method of claim 2, further comprising adjusting the error signal with an offset to intentionally adjust DT1 to not be equal to DT2.

8. The method of claim 7, wherein the offset is adaptively selected to improve efficiency of the switching converter by adjusting DT1 and DT2, wherein a sum of DT1+DT2 is a fixed value.

9. The method of claim 2, wherein the error signal comprises pulses corresponding to the dead times DT1, DT2.

10. The method of claim 2, wherein the error signal is generated by a current skew detector, the current skew detector comprising a dual phase detector, a charge pump circuit, and a difference circuit.

11. The method of claim 10, wherein the current skew detector further comprises an input level shifter for one of the series switch control signal and a shunt switch control signal, and an input time delay block for the other of the series switch control signal and a shunt switch control signal.

12. The method of claim 10, wherein the error signal is generated by the charge pump, and the charge pump is only active during the dead times DT1, DT2.

13. The method of claim 10, wherein the dual phase detector comprises symmetric interval detection for providing insensitivity of the error signal to asymmetry of rising and falling edges of the series switch control signal and a shunt switch control signal, and to inherent delays within the dual phase detector.

14. The method of claim 1, wherein the error signal is generated by a current skew detector, the current skew detector comprising a switched signal phase detector, a charge pump circuit, and a low pass filter.

15. A switching voltage regulator, comprising:
    a series switch;
    a shunt switch;
    a switching controller operative to generating a switching voltage through closing and opening of the series switch and the shunt switch as controlled by a series switch control signal and a shunt switch control signal;
    a skew detector operative to generate an error signal proportional to a relative displacement of an on-interval of the series switch and an off-interval of the shunt switch;
    the switch controller further operative to adjust a relative delay of the series switch control signal and the shunt switch control signal based on the error signal, wherein the error signal is generated based on a gate voltage of the series switch and a gate voltage of the shunt switch; and
    the voltage regulator operative to generate a regulated output voltage based upon the switching voltage.

16. The switching voltage regulator of claim 15, wherein series switch control signal and a shunt switch control signal comprise dead times in which the series switch and the shunt switch are turned off, wherein a first dead time (DT1) is defined by a period of time in which the shunt switch has just entered its off-interval, but the series switch has not yet entered its on-interval, and a second dead time (DT2) is defined by a period of time in which the series switch has just entered it off-interval and the shunt switch has not yet entered its on-interval.

17. The switching voltage regulator of claim 16, wherein the error signal is dependent upon the first dead time (DT1) and the second dead time (DT2).

18. The switching voltage regulator of claim 16, wherein the error signal is minimized when DT1 is approximately equal to DT2.

19. The switching voltage regulator of claim 16, further comprising adjusting the error signal with an offset to intentionally adjust DT1 to not be equal to DT2.

20. The switching voltage regulator of claim 15, wherein the skew detector, the current skew detector comprising a dual phase detector, a charge pump circuit, and a difference circuit.

21. The switching voltage regulator of claim 20, wherein the skew detector further comprises an input level shifter for one of the series switch control signal and a shunt switch control signal, and an input time delay block for the other of the series switch control signal and a shunt switch control signal.

22. The switching voltage regulator of claim 20, wherein the dual phase detector comprises symmetric interval detection for providing insensitivity of the error signal to asymmetry of rising and falling edges of the series switch control signal and a shunt switch control signal.

* * * * *